(12) United States Patent
Pelini

(10) Patent No.: US 7,207,617 B2
(45) Date of Patent: Apr. 24, 2007

(54) VEHICLE BODY STRUCTURE

(75) Inventor: Mauro Pelini, Shelby Township, MI (US)

(73) Assignee: Nissan Technical Center North America, Inc. MI (US)

( * ) Notice: Subject to any disclaimer, the term of this patent is extended or adjusted under 35 U.S.C. 154(b) by 0 days.

(21) Appl. No.: 11/078,350

(22) Filed: Mar. 14, 2005

(65) Prior Publication Data
US 2006/0202517 A1 Sep. 14, 2006

(51) Int. Cl.
*B62D 27/00* (2006.01)

(52) U.S. Cl. .................. 296/29; 296/203.02; 296/191; 296/198; 293/120

(58) Field of Classification Search .......... 296/203.01, 296/203.02, 193.09, 29, 198, 191, 181.1, 296/191.2; 293/120
See application file for complete search history.

(56) References Cited

U.S. PATENT DOCUMENTS

| | | | |
|---|---|---|---|
| 5,029,920 A | * | 7/1991 | Furuta et al. ............... 293/154 |
| 5,066,057 A | | 11/1991 | Furuta et al. |
| 5,226,695 A | * | 7/1993 | Flint et al. .................. 296/191 |
| 5,297,845 A | * | 3/1994 | Smartt et al. ............... 296/191 |
| 5,988,714 A | | 11/1999 | Akazawa et al. |
| 6,155,624 A | * | 12/2000 | Bienenstein, Jr. .......... 296/37.1 |
| 6,598,924 B2 | * | 7/2003 | Palmer et al. ................ 296/29 |
| 6,736,449 B2 | | 5/2004 | Takahashi et al. |
| 6,959,959 B1 | * | 11/2005 | Roush ..................... 296/186.1 |

\* cited by examiner

*Primary Examiner*—Dennis H. Pedder
(74) *Attorney, Agent, or Firm*—Global IP Counselors

(57) ABSTRACT

A vehicle body structure is provided that includes a vehicle body panel and a mounting bracket fixedly attached to the vehicle body panel. The vehicle body panel includes a main panel portion defining an exterior fascia surface of a vehicle and a panel mounting flange extending from the main panel portion. The mounting bracket includes a bracket attachment portion arranged to overlie the panel mounting flange and to extend beyond a free end of the panel mounting flange such that a fastening structure of the bracket attachment portion is located beyond the free end of the panel mounting flange of the vehicle body panel. Preferably, the vehicle body panel has other vehicle panels such as a fender panel and/or a wheel housing liner panel attached to the vehicle body panel via the mounting bracket. Preferably, the vehicle body panel is an elongated bumper fascia panel.

23 Claims, 11 Drawing Sheets

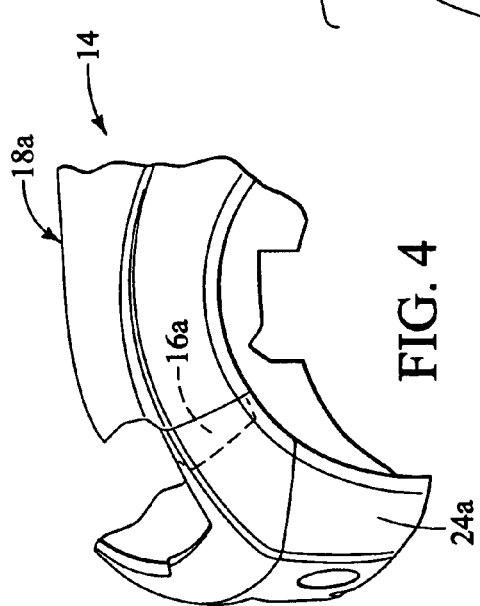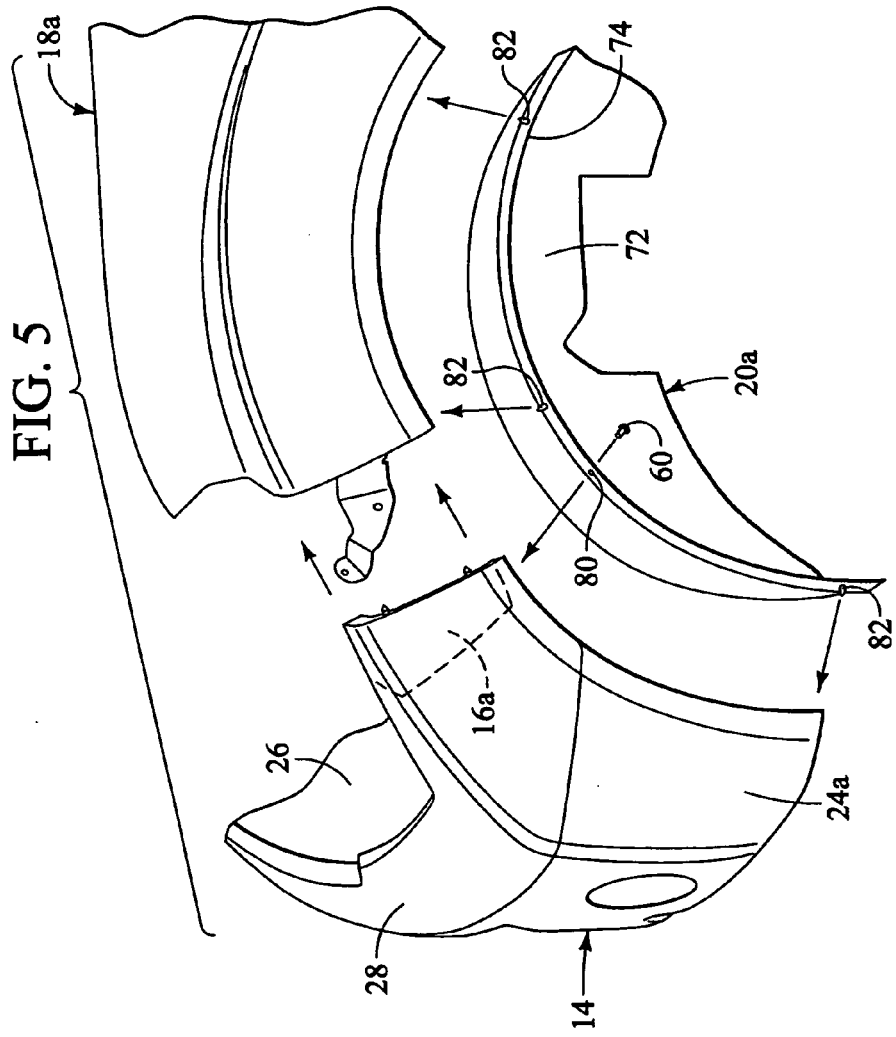

VEHICLE BODY STRUCTURE

BACKGROUND OF THE INVENTION

1. Field of the Invention

The present invention generally relates to a vehicle body structure. More specifically, the present invention relates to a vehicle body structure, which utilizes a mounting bracket attached to a vehicle body panel in order to extend the mounting flange of the vehicle body panel for attachment to an additional vehicle panel without difficulty to form a smooth transition between the exterior surfaces of the panels.

2. Background Information

For many years, automotive vehicles have been provided with front and rear bumpers to cushion the vehicle in the event of an impact. Also, for many years, automotive vehicles have been provided with numerous body and/or fascia panels coupled thereto to form the outer shell of the vehicle body. In recent years, it has been desirable to make vehicles with a smooth exterior shape, in which the bumpers are integrated with the overall shape of the vehicle body. Thus, in recent years, bumpers have often been provided with a bumper fascia panel mounted to the bumper that extends across the bumper and wraps around the corners of the bumper. Fender panels are often attached to the ends of the bumper fascia panels in a relatively smooth manner to integrate the bumpers into the overall outer shape of the vehicle body. For example, U.S. Pat. No. 5,029,920 shows a connection between fender panels and a front bumper fascia.

While these conventional structures work well, they suffer from some deficiencies. For instance, when these conventional vehicle panels are attached to the vehicle and attached to each other, it is sometimes difficult to attach the panels to each other. In particular, tooling access for attaching adjacent panels together is sometimes problematic due to limited space and due to the relatively small size of the attachment structures of the adjacent panels. Furthermore, when these conventional vehicle panels are attached to each other on a vehicle, the fit and finish between the vehicle panels is not always optimal.

In view of the above, it will be apparent to those skilled in the art from this disclosure that there exists a need for an improved vehicle body structure. This invention addresses this need in the art as well as other needs, which will become apparent to those skilled in the art from this disclosure.

SUMMARY OF THE INVENTION

One object of the present invention is to provide a vehicle body structure that allows easier tooling access for attaching vehicle panels together.

Another object of the present invention is to provide a vehicle body structure that improves fit and finish between mating parts.

The foregoing objects can basically be attained by providing a vehicle body structure that comprises a vehicle body panel and a mounting bracket. The vehicle body panel includes a main panel portion defining an exterior fascia surface of a vehicle and a panel mounting flange extending from the main panel portion. The mounting bracket is fixedly attached to the vehicle body panel. The mounting bracket includes a bracket attachment portion arranged to overlie the panel mounting flange and to extend beyond a free end of the panel mounting flange such that a fastening structure of the bracket attachment portion is located beyond the free end of the panel mounting flange of the vehicle body panel.

These and other objects, features, aspects and advantages of the present invention will become apparent to those skilled in the art from the following detailed description, which, taken in conjunction with the annexed drawings, discloses a preferred embodiment of the present invention.

BRIEF DESCRIPTION OF THE DRAWINGS

Referring now to the attached drawings which form a part of this original disclosure:

FIG. 4 is a partial perspective view of the left portion of the vehicle body structure illustrated in FIGS. 2 and 3 in accordance with the present invention;

FIG. 5 is an exploded, partial perspective view of the left portion of the vehicle body structure illustrated in FIGS. 2–4 in accordance with the present invention;

DETAILED DESCRIPTION OF THE PREFERRED EMBODIMENTS

Figure 1:
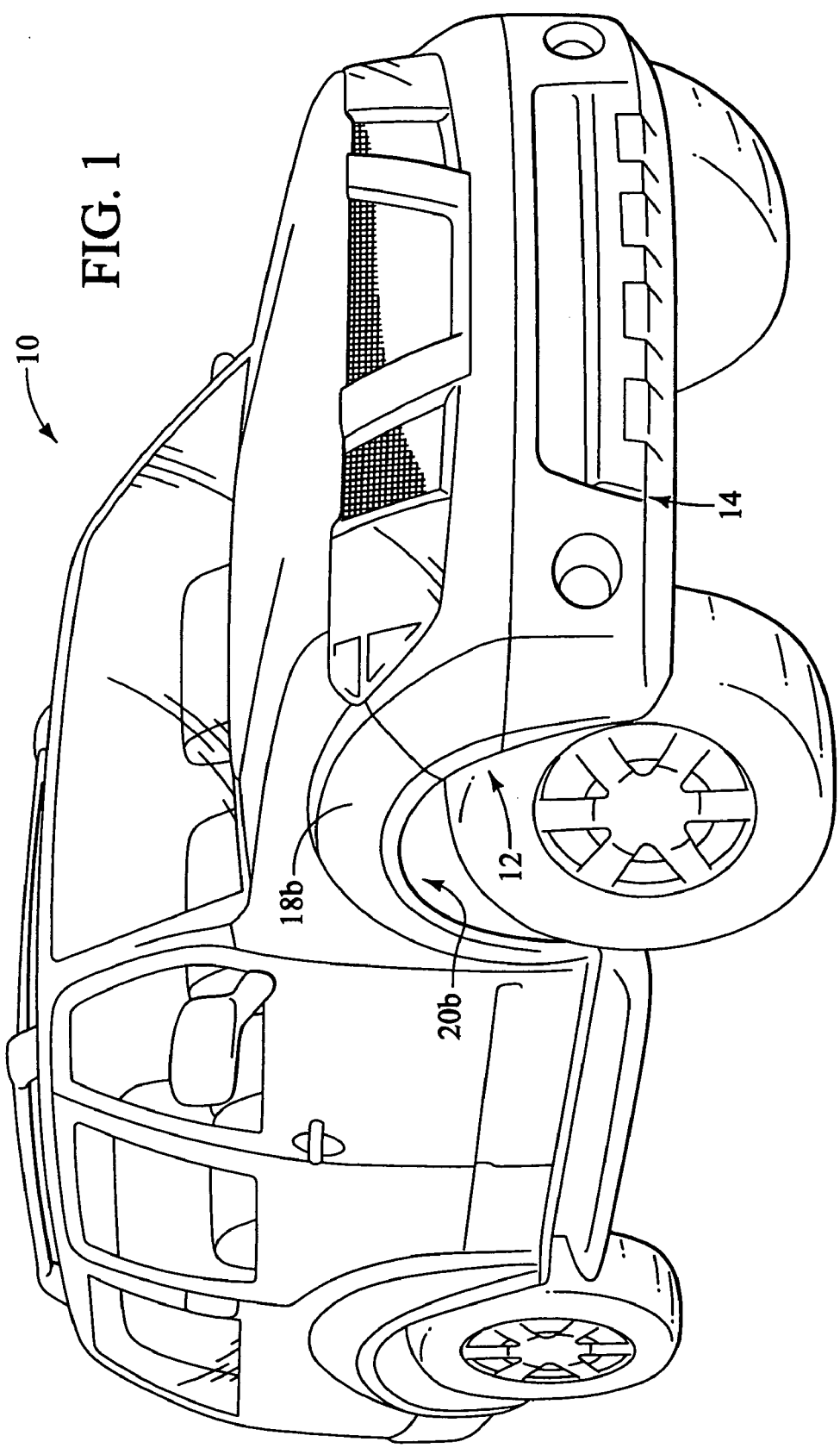
FIG. 1 is a front perspective view of a vehicle equipped with a vehicle body structure in accordance with the present invention.

A selected embodiment of the present invention will now be explained with reference to the drawings. It will be apparent to those skilled in the art from this disclosure that the following descriptions of the embodiment of the present invention are provided for illustration only and not for the purpose of limiting the invention as defined by the appended claims and their equivalents.

Referring initially to FIGS. 1–5, an automotive vehicle 10 is illustrated with a front vehicle body structure 12 in accordance with a preferred embodiment of the present invention. The vehicle 10 is conventional, except for the vehicle body structure 12. Accordingly, the vehicle 10 and its various parts will not be discussed and/or illustrated in detail herein, except as related to the vehicle body structure 12 of the present invention. The vehicle body structure 12 basically includes a bumper fascia panel 14, a pair of mounting brackets 16a and 16b, a pair of fender body panels 18a and 18b, and a pair of wheel housing liner panels 20a and 20b coupled together in accordance with the present invention. The mounting brackets 16a and 16b are fixedly attached to opposite ends of the bumper fascia panel 14 to effectively create a pair of enlarged attachment areas at the opposite ends of the bumper fascia panel 14 in accordance with the present invention, as explained below in more detail.

The vehicle body structure 12 is configured to be fixedly attached to a main front bumper member (not shown) of the vehicle 10 to form part of a front bumper structure of the vehicle 10 in accordance with the present invention. However, even though the vehicle body structure 12 is illustrated at the front of the vehicle 10 in this embodiment, it will be apparent to those skilled in the automotive art from this disclosure that the present invention can applied to the rear of a vehicle (i.e. the rear bumper) as needed and/or desired. Moreover, it will be apparent to those skilled in the automotive art from this disclosure that the present invention can be applied to other areas of the vehicle body if appropriate, as needed and/or desired. In any case, the main bumper member is a relatively conventional rigid transverse member that is attached to the frame or unitized body (i.e. depending on the type of vehicle construction utilized) of the vehicle 10 in a conventional manner.

The bumper fascia panel 14 is configured to be fixedly attached to the main front bumper member of the vehicle 10 as discussed below. As mentioned above, the mounting brackets 16a and 16b are fixedly attached to opposite ends of the bumper fascia panel 14 to effectively create a pair of enlarged attachment areas at the opposite ends of the bumper fascia panel 14. The fender body panel 18a is fixedly attached to one end of the bumper fascia panel 14 via the mounting bracket 16a, while the fender body panel 18b is fixedly attached to the other end of the bumper fascia panel 14 via the mounting bracket 16b, as explained below in more detail. The wheel housing liner panel 20a is fixedly attached to a first end of the bumper fascia panel 14, the mounting bracket 16a and the fender body panel 18a, while a second end of the wheel housing liner panel 20a is fixedly attached to the bumper fascia panel 14, the mounting bracket 16b and the fender body panel 18b. The connections between the wheel housing liner panels 20a and 20b are not important to the present invention. Thus, the wheel housing liner panels 20a and 20b and their connections to the various parts will not be discussed or illustrated in detail herein.

Figure 2:
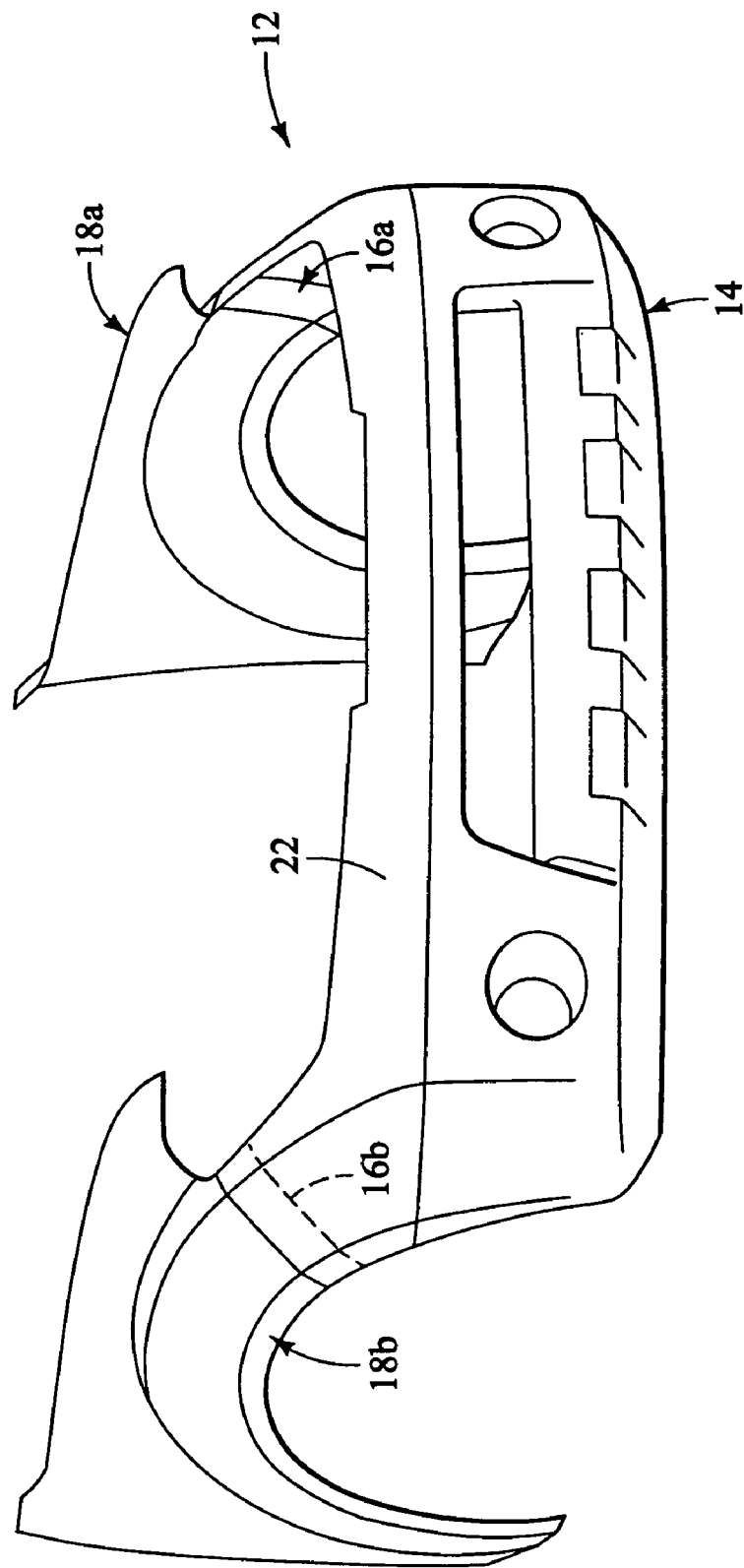
FIG. 2 is a front perspective view of selected parts of the vehicle body structure removed from the vehicle illustrated in FIG. 1 in accordance with the present invention.
Figure 3:
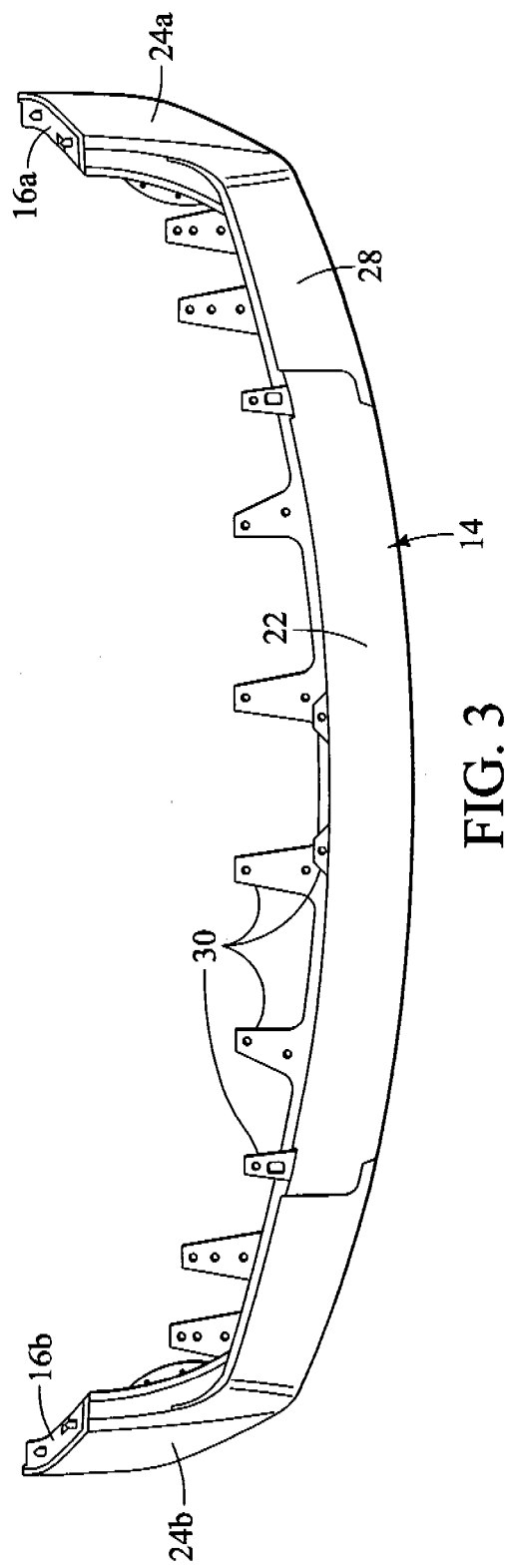
FIG. 3 is a top plan view of selected parts of the vehicle body structure illustrated in FIG. 2 with the fender body panels removed to show the mounting brackets in accordance with the present invention.

Referring now to FIGS. 2–8, the bumper fascia panel 14 will now be discussed in more detail. The bumper fascia panel 14 basically includes an elongated transverse portion 22, a first bent end portion 24a and a second bent end portion 24b. The first and second bent end portions 24a and 24b are arranged at opposite ends of the transverse portion 22 such that the bumper fascia panel 12 has a wide, substantially U-shaped overall profile as viewed from above (FIG. 3). The bumper fascia panel 14 has contoured interior and exterior surfaces 26 and 28 extending along the first bent end portion 24a, the transverse portion 22 and the second bent end portion 24b. Preferably, the contoured interior surface 26 has a concave shape as viewed in transverse cross-section, while the contoured exterior surface 28 has a concave shape as viewed in transverse cross-section. The fender body panels 18a and 18b are fixedly coupled to the first and second bent end portions 24a and 24b of the bumper fascia panel 14 by the mounting brackets 16a and 16b.

Preferably, the transverse portion 22, the first bent end portion 24a and the second bent end portion 24b are integrally formed together as a one-piece unitary member from a thin, lightweight sheet material such as a plastic sheet material or any other material that is well known in the automotive art. In any case, the bumper fascia panel 14 should be constructed of a self supporting material with a degree of flexibility such that the bumper fascia panel 14 is flexible yet maintains its shape.

The elongated transverse portion 22 is preferably a slightly arc-shaped portion (i.e. substantially linear) that preferably has a plurality of mounting tabs 30 extending inwardly from the contoured interior surface 26 in a longitudinally spaced configuration from each other. The mounting tabs 30 are fixedly attached to the main bumper member in a conventional manner via fasteners such as rivets, screws or the like. Preferably, the mounting brackets 16a and 16b are fixedly attached to the bumper fascia panel 14 prior to fixedly attaching mounting tabs 30 of the bumper fascia panel 14 to the main bumper member. As seen in FIG. 2, the transverse portion 22 can have cutouts for lights and/or other vehicle components.

The bent end portions 24a and 24b are preferably mirror images of each other. Thus, for the sake of brevity, only the bent end portion 24a will be discussed and illustrated in detail herein. However, it will be apparent to those skilled in the automotive art from this disclosure that the descriptions and illustrations of the bent end portion 24a also apply to the bent end portion 24b.

Figure 8:
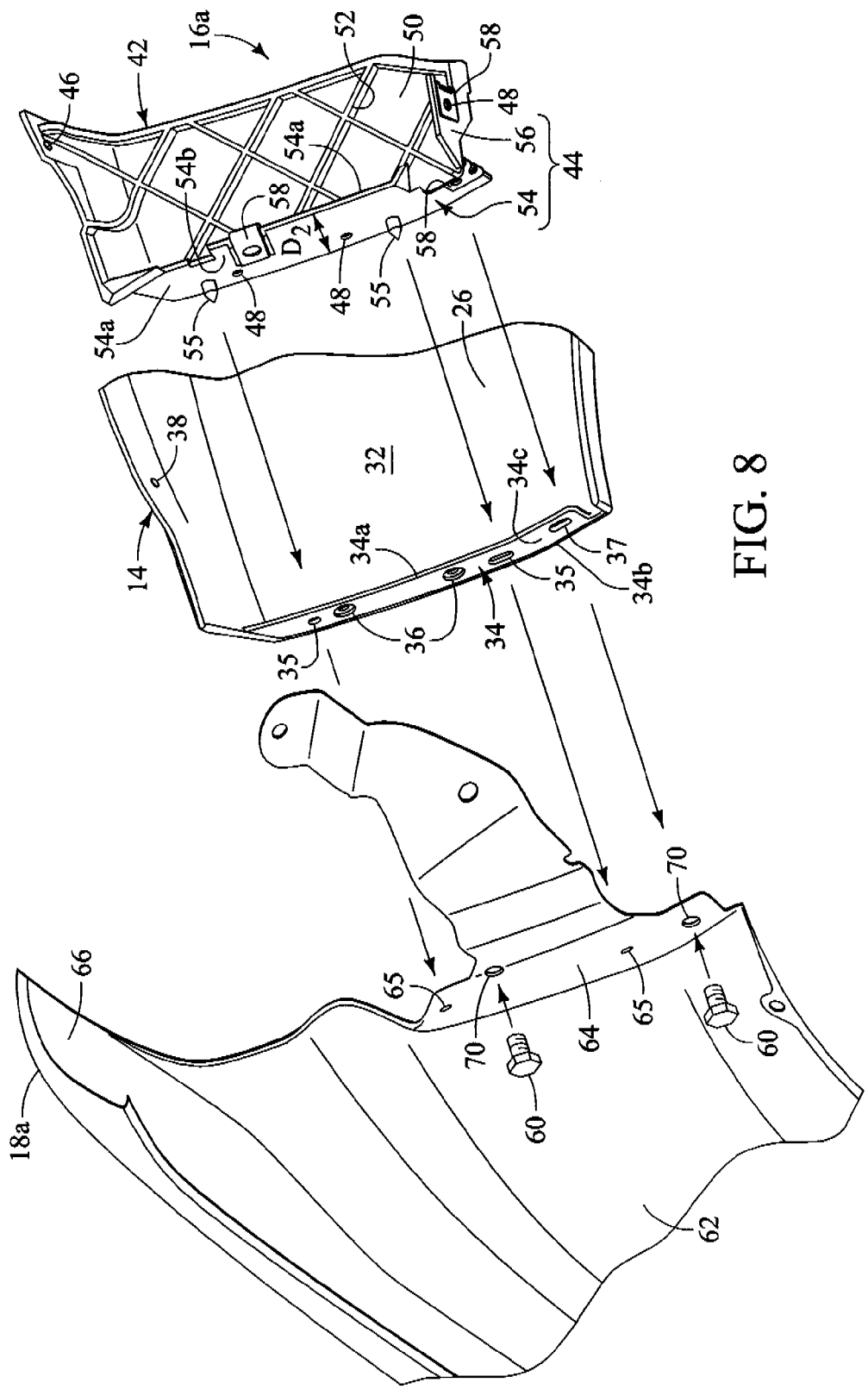
FIG. 8 is an exploded, partial perspective view of the left portion of the vehicle body structure illustrated in FIGS. 2–7 in accordance with the present invention.
Figure 9:
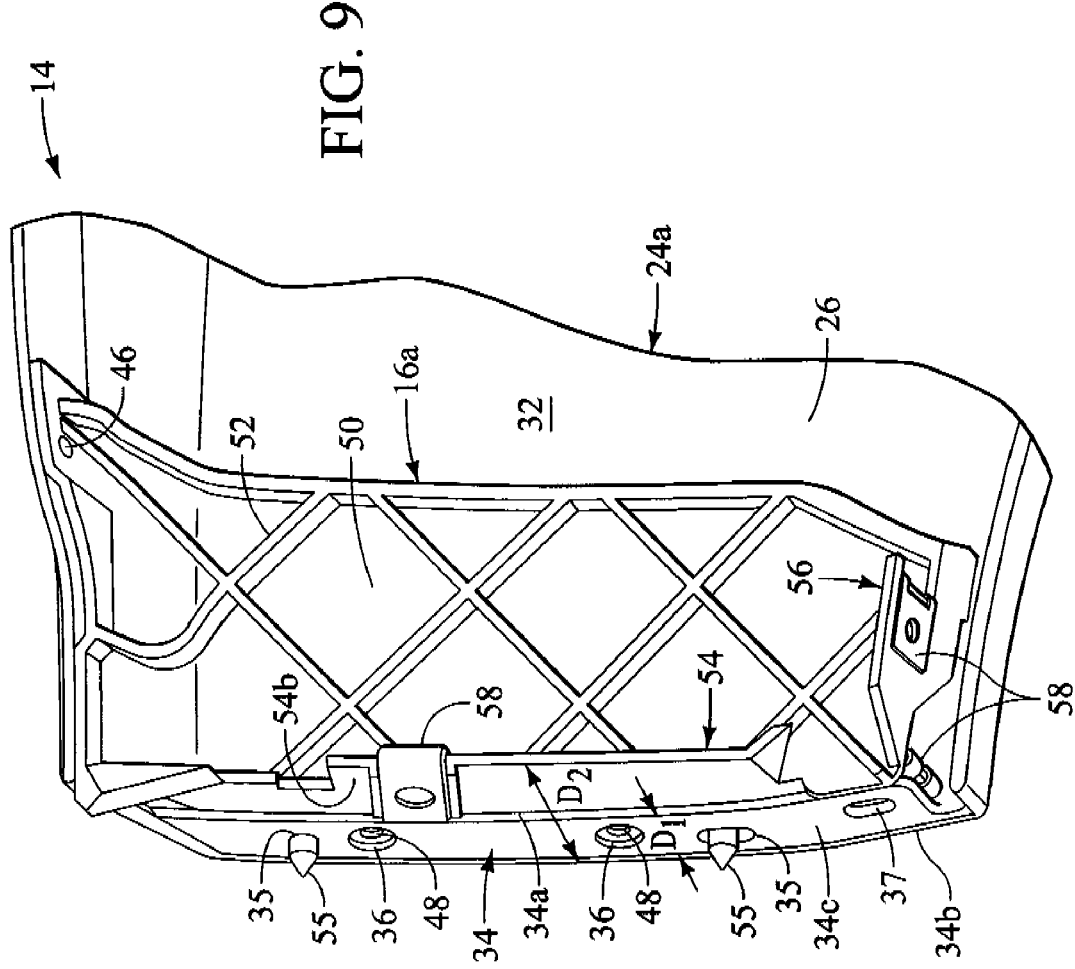
FIG. 9 is a partial inside perspective view of selected parts of the left portion of the vehicle body structure illustrated in FIGS. 2–8 showing the bumper fascia panel with the mounting bracket coupled thereto in accordance with the present invention.
Figure 10:
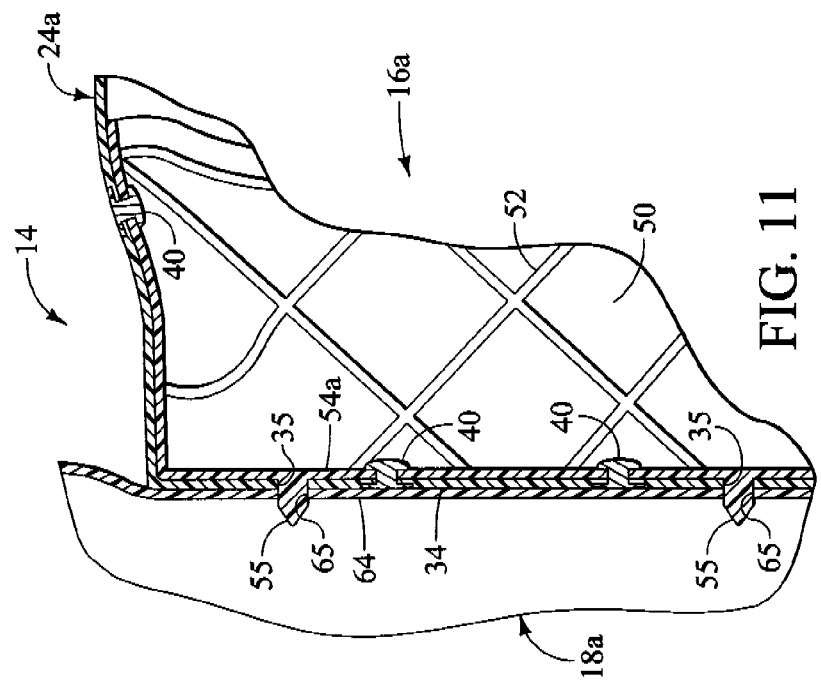
FIG. 10 is a partial cross sectional view of the vehicle body structure illustrated in FIGS. 2–9 as seen along section line 10—10 in FIG. 7 and showing the connection between the bumper fascia panel and the fender body panel using the mounting bracket in accordance with the present invention.
Figure 11:
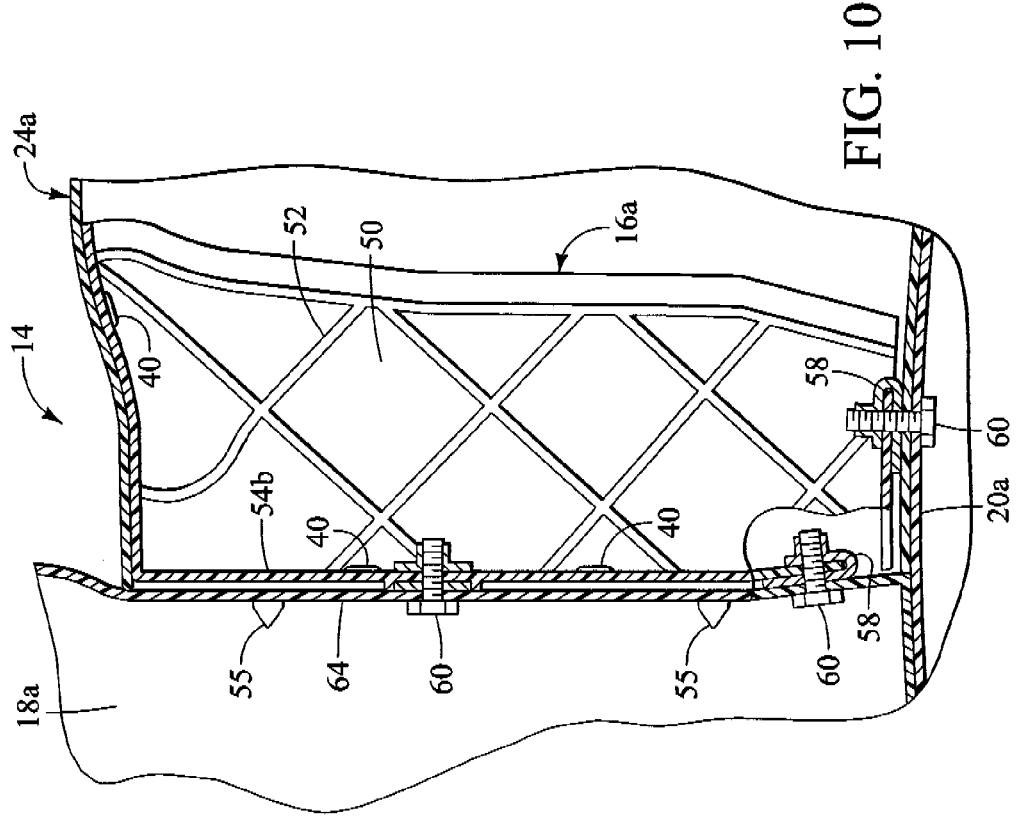
FIG. 11 is a partial cross sectional view of the vehicle body structure illustrated in FIGS. 2–10 as seen along section line 11—11 in FIG. 7 and showing the connection between the bumper fascia panel and the fender body panel using one of the mounting brackets in accordance with the present invention.

Referring now to FIGS. 8–10, the first bent end portion 24a basically includes a main panel portion 32 forming part of the contoured exterior surface 28 and a panel mounting flange 34. The mounting flange 34 extends from the main panel portion 32 to a free edge 34a from an exterior edge 34b formed between the main panel portion 32 and the panel mounting flange 34. Thus, the panel mounting flange 34 extends from the main panel portion 32 at an angle to form the exterior edge 34b between the contoured exterior surface 28 of the main panel portion 32 and a mounting surface 34c of the panel mounting flange 34 such that the exterior edge 34b is visible when installed. Preferably, the panel mounting flange 34 extends at approximately a right angle relative to the main panel portion 32 such that the free edge 34a is spaced a first predetermined distance $D_1$ from the exterior edge 34b located at the contoured exterior surface 28, as measured perpendicularly to the contoured exterior surface 28 from the exterior edge 34b. The panel mounting flange 34 further includes a pair of locating openings 35 and a pair of attachment holes 36 for locating and securing the mounting bracket 16a thereto. A bolt hole 37 is also formed in the panel mounting flange 34 to fasten the fender body panels 18a thereto as explained below. The mounting bracket 16a effectively create an enlarged attachment area of the panel mounting flange 34 of the bumper fascia panel 14 to attach the fender body panel 18a thereto. The main panel portion 32 also has an attachment hole 38 for securing the mounting bracket 16a directly the main panel portion 32 of the bumper fascia panel 14. The aftachment holes 36 and 38 are each configured to receive one of a plurality of rivets 40 therethrough to fixedly attach the mounting bracket 16a to the bent end portion 24a of the bumper fascia panel 14.

The bumper fascia panel 14 (vehicle body panel) and the mounting bracket 16a are fixedly attached together with the rivets 40. Specifically, the panel mounting flange 34 and the mounting bracket 16a are preferably fixedly attached to each other with two rivets 40 at the attachment holes 36, and the main panel portion 32 and the mounting bracket 16a are preferably fixedly attached to each other with one of the rivets 40 at the attachment hole 38. Due to the locations of the attachment holes 35 and 36, the panel mounting flange 34 and the mounting bracket 16a are fixed together at two spaced apart locations, while the main panel portion 32 and the mounting bracket 16a are also fixed together at an additional location. The locating openings 35 are used to orient the mounting bracket 16a relative to the bumper fascia panel 14 prior to attaching them together with the rivets 40, as explained below.

The contoured interior surface 26 extends along the main panel portion 32, and terminates at the panel mounting flange 34. The upper end portion of the main panel portion 32 forms an overhanging section that is supported by the mounting bracket 16a. The mounting bracket 16a is shaped to support the main panel portion 32 and the panel mounting flange 34 of the bent end portion 24a, as explained below.

Figure 13:
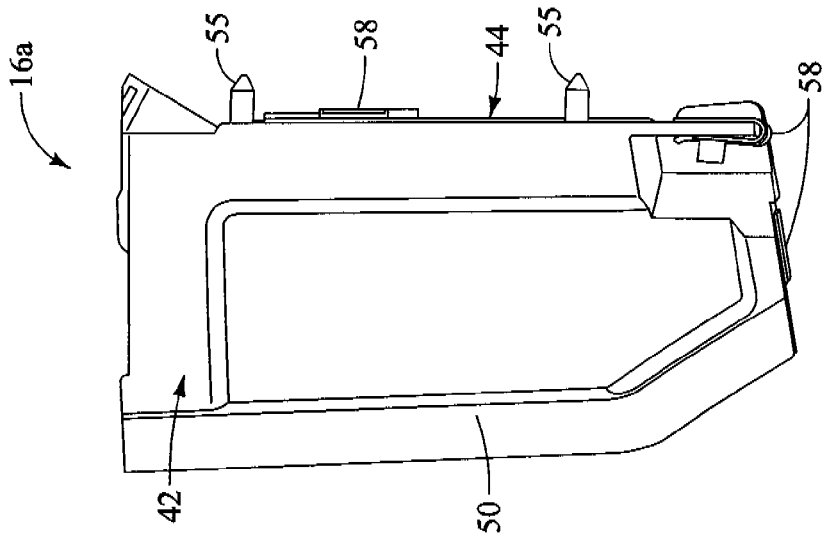
FIG. 13 is an outside elevational view of the mounting bracket illustrated in FIGS. 11 and 12 in accordance with the present invention.
Figure 12:
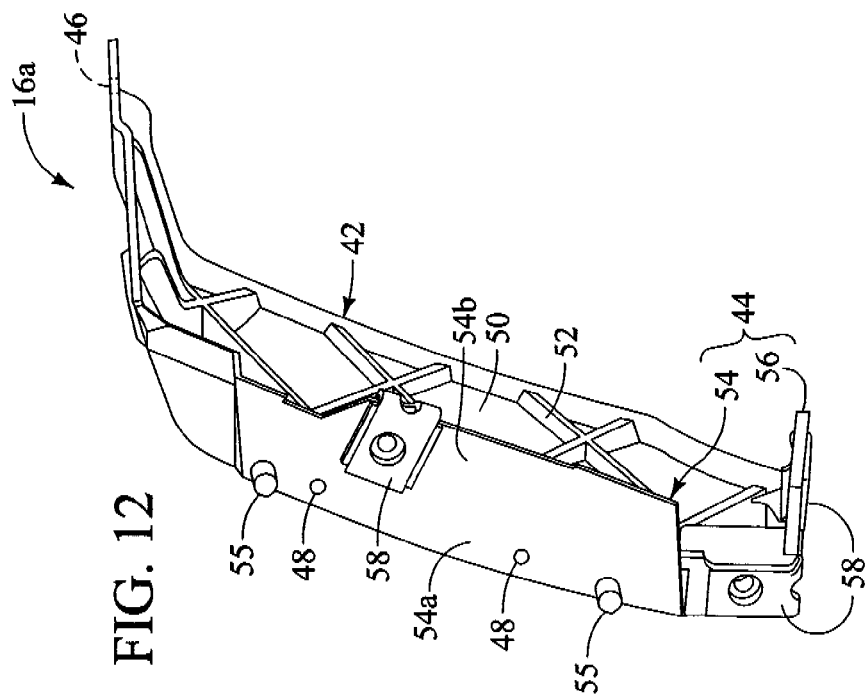
FIG. 12 is an rear perspective view of the mounting bracket illustrated in FIG. 11 in accordance with the present invention.
Figure 14:
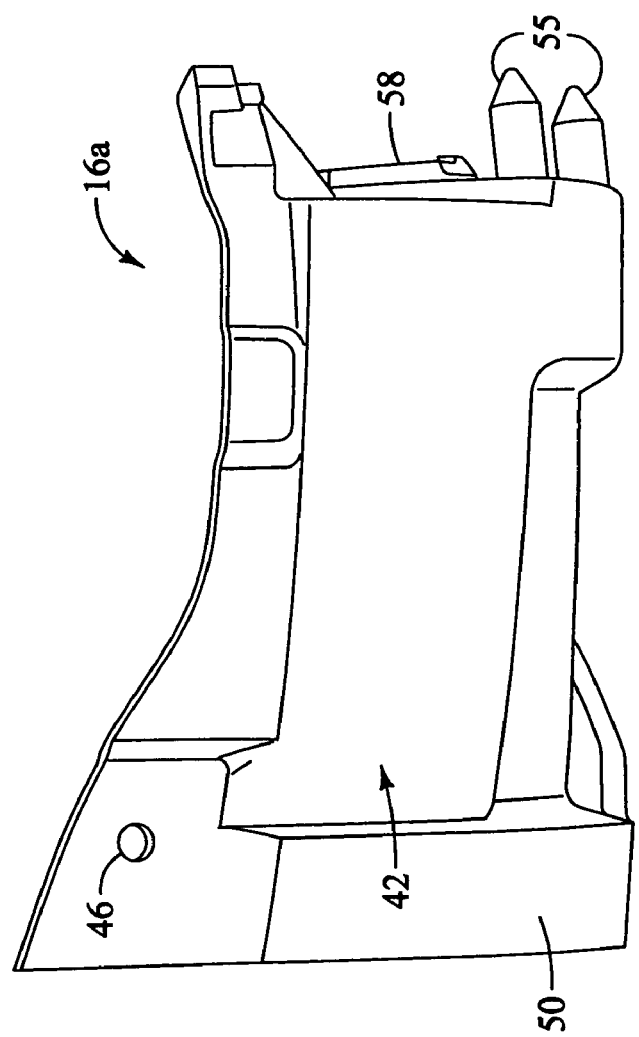
FIG. 14 is a top perspective view of the mounting bracket illustrated in FIGS. 11–13 in accordance with the present invention.

Referring now to FIGS. 12–14, the mounting brackets 16a and 16b will now be discussed in more detail. The mounting brackets 16a and 16b are preferably mirror images of each other. Thus, for the sake of brevity, only the mounting bracket 16a will be discussed and illustrated in detail herein. However, it will be apparent to those skilled in the automotive art from this disclosure that the descriptions and illustrations of the mounting bracket 16a also apply to the mounting bracket 16b. Furthermore, it will be apparent to those skilled in the automotive art from this disclosure that the mounting brackets 16a and 16b are attached to the bent end portions 24a and 24b, respectively, in identical manners, except they are attached in mirror image configurations. Thus, only attachment of the mounting bracket 16a to the bent end portion 24a will be discussed and illustrated in detail herein, for the sake of brevity.

The mounting bracket 16a basically includes a body panel supporting portion 42 and a bracket attachment portion 44 extending from the body panel supporting portion 42. Preferably, the bracket attachment portion 44 extends at approximately a right angle relative to the body panel supporting portion 42 to form a substantially L-shaped cross-sectional profile as viewed from above/below. The body panel supporting portion 42 and the bracket attachment portion 44 are preferably integrally formed together as a one-piece, unitary member from a lightweight, rigid material such as a plastic material or any other material that is well known in the automotive art.

The body panel supporting portion 42 contacts the main panel portion 32 along at least a majority of its width to maintain the shape of the main panel portion 32, while the bracket attachment portion 44 contacts the panel mounting flange 34 to maintain the orientation of (i.e. to support) the panel mounting flange 34 relative to the main panel portion 32. In other words, the mounting bracket 16a preferably has an external shape substantially corresponding to the internal shape of the free end of the bent end portion 24a with the panel mounting flange 34.

The body panel supporting portion 42 includes an attachment hole 46 extending therethrough, while the bracket attachment portion 44 includes a pair of attachment holes 48 extending therethrough. The attachment holes 46 and 48 are configured to be aligned with the attachment holes 38 and 36 of the first bent end portion 24a to receive the rivets 40 therethrough to fixedly attach the mounting bracket 16a to the first bent end portion 24a. In other words, the bracket attachment portion 44 and the panel mounting flange 34 are fixedly attached with at least one of the rivets 40 (i.e. two rivets in the illustrated embodiment), and the body panel supporting portion 42 and the main panel portion 32 are fixedly attached with at least one of the rivets 40 (i.e. only one rivet in the illustrated embodiment). Thus, the bent end portion 24a of the bumper fascia panel 14 is preferably fixedly attached to the mounting bracket 16a via three of the rivets 40 at three spaced apart locations.

The body panel supporting portion 42 basically includes a contoured outward support surface 50 and a ribbed internal surface 52. The body panel supporting portion 42 preferably has a substantially rectangular configuration as viewed along a direction substantially perpendicular to the support surface 50, and a substantially arc-shaped configuration as viewed along a direction substantially perpendicular to the bracket attachment portion 44. The ribbed internal surface 52 includes a plurality of diagonally crossing ribs that provide structural reinforcement/strength to the mounting bracket 16a.

The outward support surface 50 has an overall shape corresponding to the internal surface 26 of the main panel portion 32. In other words, the support surface 50 of the mounting bracket 16a contacts the main panel portion 32 to support the main panel portion 32. Specifically, the outward support surface 50 is a contoured mating surface corresponding to the contoured interior surface 26 of the main panel portion 32 and contacting the contoured interior surface 26 along a majority of one edge of the main panel portion 32 that has the mounting bracket 16a fixedly attached thereto. More specifically, as seen in FIG. 13, the contoured outward support surface 50 preferably includes a central recessed area surrounded by a raised border to form an annular shaped contact area that contacts the contoured interior surface 26 of the main panel portion 32.

The bracket attachment portion 44 basically includes a fender attachment section 54 and a wheel housing liner attachment section 56 that is angled relative to the fender attachment section 54. The fender attachment section 54 has the attachment holes 48 formed therein, and also includes a pair of locating pins 55 extending therefrom that are configured to be disposed in (i.e. preferably received completely through) the locating openings 35 to orient the mounting bracket 16a relative to the bent end portion 24a of the bumper fascia panel 14 prior to installing the rivets 40. The locating pins 55 extend at least partially into the locating openings 35 of the panel mounting flange 34. Preferably, the locating pins 55 extend through the panel mounting flange 34 to engage the fender body panel 18a, as explained below in more detail.

The fender attachment section 54 of the bracket attachment portion 44 overlies the mounting surface 34c of the panel mounting flange 34 and then extends beyond the free end or edge 34a of the panel mounting flange 34 such that a free end or edge 54a of the fender attachment section is spaced a second predetermined distance $D_2$ from the contoured exterior surface 28, as measured perpendicularly to the contoured exterior surface 28 from the exterior edge 34b. The second predetermined distance $D_2$ is preferably about twice the first predetermined distance $D_1$ such that a fastening structure of the bracket attachment portion 44 is located beyond the free end 34a of the panel mounting flange 32. Accordingly, as seen in FIGS. 8 and 9, the mounting surface 34c of the panel mounting flange 34 is exposed to mate with the fender body panel 18a (i.e., an additional vehicle panel). The attachment section 54 of the bracket attachment portion 44 has an overlapping part 54a and an extension part 54b. The overlapping part 54a overlies the panel mounting flange 34 on a side of the panel mounting flange 34 that faces in an opposite direction to the mounting surface 34c of the panel mounting flange 34. The extension part 54b extends parallel to the panel mounting flange 34 and beyond a free end of the panel mounting flange 34 by the second predetermined distance $D_2$. As mentioned above, the extension part 54b of the fender attachment section 54 has the conventional J-nut 58 overlying a bolt hole such that the J-nuts 58 form parts of the fastening structure of the bracket attachment portion 44 which is located beyond the free end 34a of the panel mounting flange 34 such the extension part 34 is configured to be attached to the additional vehicle panel (e.g., the fender body panel 18a) by this fastening structure.

The wheel housing liner attachment section 56 preferably forms approximately a right angle with the fender attachment section 54 to form a substantially L-shaped cross-sectional shape as viewed from above/below.

Each of the fender attachment section 54 and the wheel housing liner attachment section 56 has at least one conventional J-nut 58 overlying a bolt hole such that the J-nuts 58 form parts of the fastening structure of the bracket attachment portion 44. The J-nuts 58 are designed to receive threaded fasteners 60 such as attachment bolts in order to attach the fender body panel 18a and the wheel housing liner panel 20a to the mounting bracket 16a.

Figure 7:
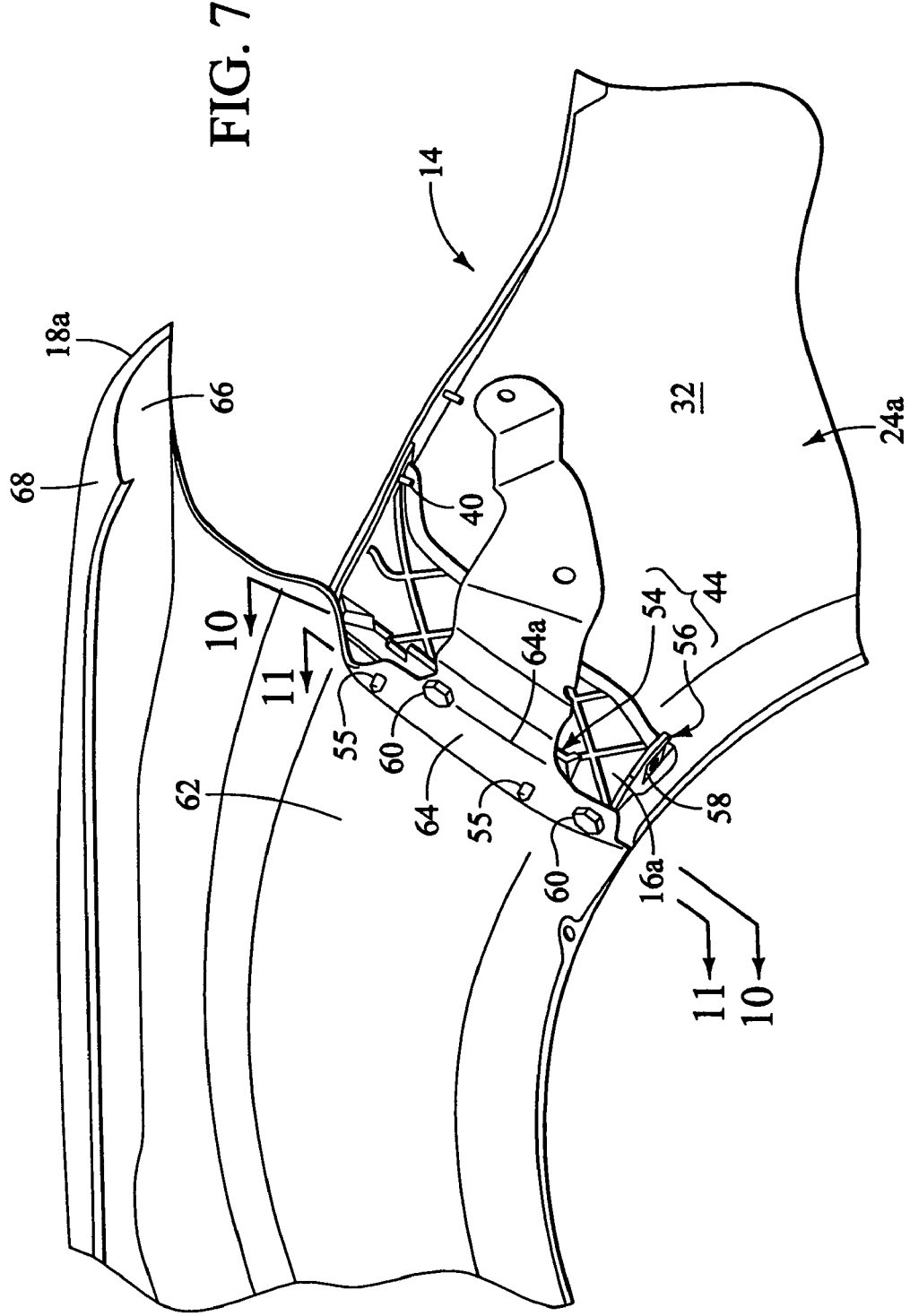
FIG. 7 is a partial underside perspective view of the left portion of the vehicle body structure illustrated in FIGS. 2–6 showing the wheel housing liner panel overlying the bumper fascia panel and the fender body panel in accordance with the present invention.

Referring now to FIGS. 5, 7 and 10, the fender body panels 18a and 18b will now be discussed in more detail. The fender body panels 18a and 18b are preferably mirror images of each other. Thus, for the sake of brevity, only the fender body panel 18a will be discussed and illustrated in detail herein. However, it will be apparent to those skilled in the automotive art from this disclosure that the descriptions and illustrations of the fender body panel 18a also apply to the fender body panel 18b. Furthermore, it will be apparent to those skilled in the automotive art from this disclosure that the fender body panels 18a and 18b are attached to the mounting brackets 16a and 16b, respectively, in identical manners, except they are attached in mirror image configurations. Thus, only attachment of the fender body panel 18a to the mounting bracket 16a will be discussed and illustrated in detail herein, for the sake of brevity.

The fender body panel 18a basically includes a main fender part 62 and an attachment part 64 extending from the main fender part 62. The attachment part 64 is fixedly attached to the fender attachment section 54 of the mounting bracket 16a with one of the threaded fasteners 60. Thus, the fender body panel 18a is fixedly attached to the bumper fascia panel 14 via the mounting bracket 16a. The fender body panel 18a is preferably attached to the mounting bracket 16a after the mounting bracket 16a is attached to the bumper fascia panel 14. The attachment part 64 is also configured to be fixedly attached to another part that is not shown.

The main fender part 62 and the attachment part 64 are preferably integrally formed together as a one-piece unitary member from a thin, lightweight sheet material such as a plastic sheet material or any other material that is well known in the automotive art. In any case, the fender body panel 18a should be constructed of a self supporting material with a degree of flexibility such that the fender body panel 18a is at least slightly flexible yet maintains its shape.

The main fender part 62 is an arc-shaped member, which extends around the wheel well of the vehicle 10. The main fender part 62 is preferably fixedly coupled to other parts and/or other vehicle body panel(s) in a conventional manner, depending on the construction of the vehicle 10. The main fender part 62 is relatively conventional. Thus, the main fender part 62 will not be discussed and/or illustrated in detail herein. The main fender part 62 basically includes a contoured interior surface 66, a contoured exterior surface 68 and at least one additional attachment part (not shown) that is attached to the vehicle 10 in a conventional manner.

The attachment part 64 is basically a flange shape plate member that extends at a substantially right angle relative to the main fender part 62 to a free end. The attachment part 64 preferably has a predetermined width that is substantially equal to the second predetermined distance $D_2$ such that the attachment part 64 has a size substantially equal to the size of the fender attachment section 54 of the mounting bracket 16a, which is coupled thereto. Thus, the attachment part 64 preferably contacts at least the panel mounting flange 34 and optionally contacts the fender attachment section 54 of the mounting bracket 16a.

In any event, the attachment part 64 preferably has a thickness and depth substantially corresponding to the thickness and depth of the free end of the bent end portion 24a with the mounting bracket 16a fixedly attached thereto. The attachment part 64 includes a pair of pin receiving holes 65 and a pair of fastener attachment openings 70. The pin receiving holes 65 are configured to receive the locating pins 55 therein to locate the fender body panel 18a relative to the bent end portion 24a. The attachment openings 70 are configured to receive the threaded fasteners 60 such that the fasteners 60 can be threadedly attached to the J-nuts 58 of the fender attachment section 54. Thus, the locating pins 55 preferably extend though the locating openings 35 of the bumper fascia panel 14 and though the locating openings 65 of the fender body panel 18a so that the bumper fascia panel 14 and the fender body panel 18a are aligned prior to installing the threaded fasteners 60.

Once the bumper fascia panel 14, the mounting bracket 16a and the fender body panel 18a are attached together, the exterior surface 28 (i.e. an exterior fascia surface) of the bumper fascia panel 14 meets the exterior surface 68 (i.e. an additional exterior fascia surface) of the fender body panel 18a to form a substantially contiguous flush overall outer body surface therebetween. In other words, a smooth transition is created between the bumper fascia panel 14 and the fender body panel 18a when the fender body panel 18a (i.e. an additional vehicle panel) is fixedly attached to the bumper fascia panel 14 via the mounting bracket 16a.

Figure 6:
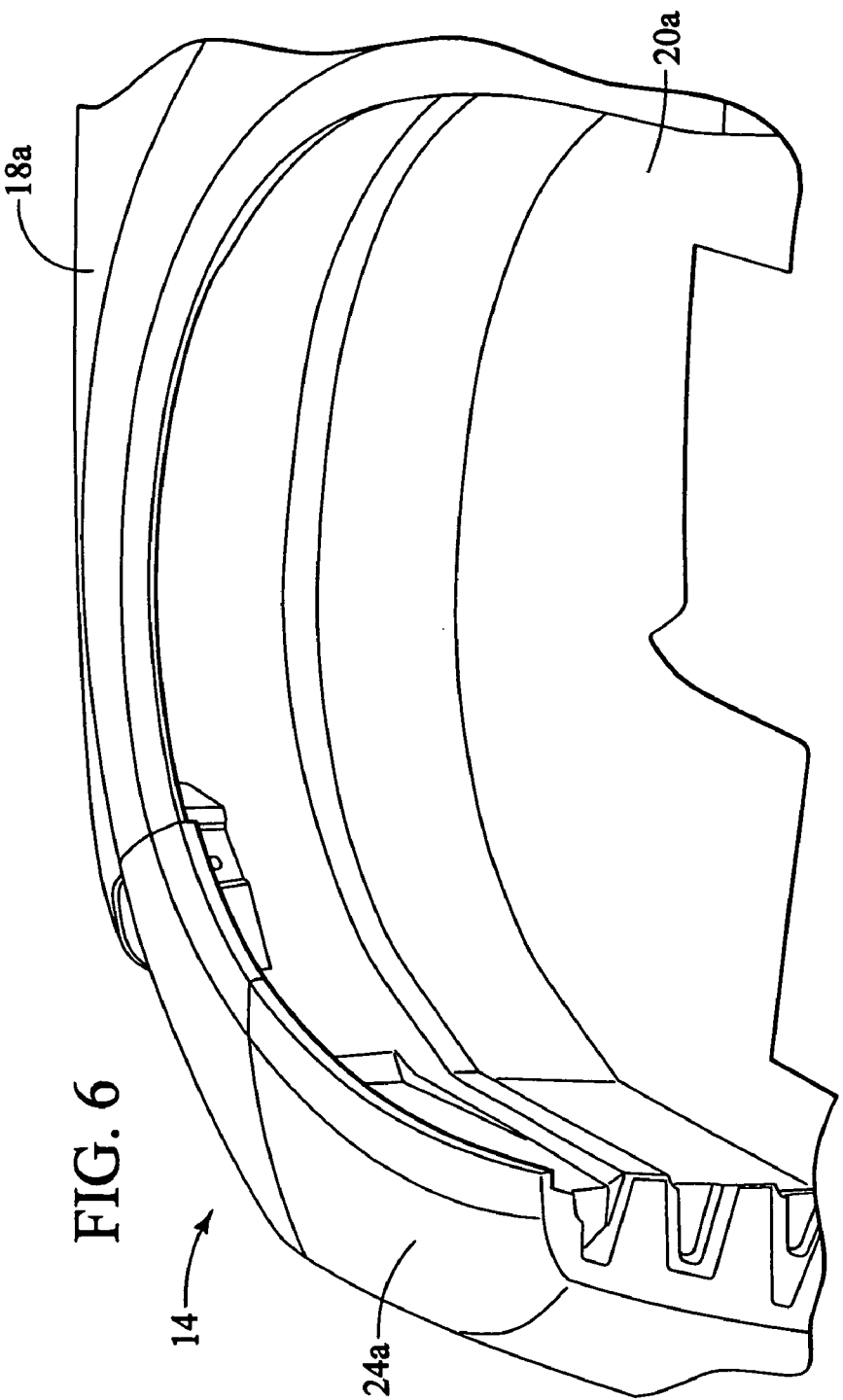
FIG. 6 is a partial inside perspective view of the left portion of the vehicle body structure illustrated in FIGS. 2–5 showing the connection between the bumper fascia panel and the fender body panel using the mounting bracket in accordance with the present invention.

Referring now to FIGS. 1, and 6, the wheel housing liner panels 20a and 20b are diagrammatically illustrated. The wheel housing liner panels 20a and 20b are substantially mirror images of each other. However, the precise shape and construction of the wheel housing liner panels 20a and 20b is not important to the present invention. Thus, for the sake of brevity, the wheel housing liner panels 20*a* and 20*b* will not be discussed and illustrated in detail herein. Moreover, it will be apparent to those skilled in the automotive art from this disclosure that the descriptions and illustrations of the wheel housing liner panel 20*a* also apply to the wheel housing liner panel 20*b*. Furthermore, it will be apparent to those skilled in the automotive art from this disclosure that the wheel housing liner panels 20*a* and 20*b* are attached to the mounting brackets 16*a* and 16*b*, respectively, in identical manners, except they are attached in mirror image configurations. Thus, only attachment of the wheel housing liner panel 20*a* to the mounting bracket 16*a* will be discussed and illustrated in detail herein, for the sake of brevity.

The wheel housing liner panel 20*a* basically includes a main liner portion 72 and an attachment part 74 extending from the main liner portion 72. The main liner portion 72 and the attachment part 74 are preferably integrally formed together as a one-piece unitary member from a thin, lightweight sheet material such as a plastic sheet material or any other material that is well known in the automotive art. In any case, the wheel housing liner panel 20*a* should be constructed of a self supporting material with a degree of flexibility such that the wheel housing liner panel 20*a* is at least slightly flexible yet maintains its shape.

The main liner portion 72 is an arc-shaped member, which extends around the wheel well of the vehicle 10. The main liner portion 72 is relatively conventional. Thus, the main liner portion 72 will not be discussed and/or illustrated in detail herein. The main liner portion 72 and the attachment part 74 are preferably fixedly coupled to at various locations to either the bumper fascia panel 14 or other parts that are not shown in a conventional manner, depending on the construction of the vehicle 10. Only those attachment points that are relevant to the illustrated embodiment of the present invention will be discussed.

The attachment part 74 is basically a flange shape plate member that extends at a substantially right angle relative to the main liner portion 72. The attachment part 74 is fixedly attached to the wheel housing liner attachment section 56 of the mounting bracket 16*a* with one of the threaded fasteners 60. In particular, as seen in FIG. 5, the attachment part 74 includes an attachment opening 80 that is configured to receive one of the threaded fasteners 60 such that the fastener 60 can be threadedly attached to the J-nut of the liner attachment section 56. Thus, the wheel housing liner panel 20*a* is fixedly attached to the bumper fascia panel 14 via the mounting bracket 16*a*. The attachment part 74 of the wheel housing liner panel 20*a* is also riveted directly to the bent end portion 24*a* of the bumper fascia panel 14 and the fender body panel 18*a* by rivets 82 as best seen in FIG. 5.

The wheel housing liner panel 20*a* is also preferably attached to the mounting bracket 16*a* after the mounting bracket 16*a* is attached to the bumper fascia panel 14. Moreover, the wheel housing liner panel 20*a* is preferably attached to the mounting bracket 16*a* after the fender body panel 18*a* is attached to the mounting bracket 16*a*.

As used herein, the following directional terms "forward, rearward, above, downward, vertical, horizontal, below and transverse" as well as any other similar directional terms refer to those directions of a vehicle equipped with the present invention. Accordingly, these terms, as utilized to describe the present invention should be interpreted relative to a vehicle equipped with the present invention. The terms of degree such as "substantially", "about" and "approximately" as used herein mean a reasonable amount of deviation of the modified term such that the end result is not significantly changed. For example, these terms can be construed as including a deviation of at least +5% of the modified term if this deviation would not negate the meaning of the word it modifies.

While only a selected embodiment has been chosen to illustrate the present invention, it will be apparent to those skilled in the art from this disclosure that various changes and modifications can be made herein without departing from the scope of the invention as defined in the appended claims. Furthermore, the foregoing descriptions of the embodiment according to the present invention are provided for illustration only, and not for the purpose of limiting the invention as defined by the appended claims and their equivalents. Thus, the scope of the invention is not limited to the disclosed embodiment.

What is claimed is:

1. A vehicle body structure comprising:
   a vehicle body panel including a main panel portion defining an exterior fascia surface of a vehicle and a panel mounting flange extending from the main panel portion at an angle to form an exterior edge between the exterior fascia surface of the vehicle body panel and a mounting surface of the panel mounting flange such that the exterior edge is visible when installed; and
   a mounting bracket fixedly attached to the vehicle body panel such that the mounting surface of the panel mounting flange is exposed to mate with at least one additional vehicle panel, the mounting bracket including
   a bracket attachment portion having an overlapping part overlying the panel mounting flange on a side of the panel mounting flange that faces in an opposite direction to the mounting surface of the panel mounting flange, and an extension part extending parallel to the panel mounting flange and beyond a free end of the panel mounting flange, the extension part of the bracket attachment portion including a fastening structure that is located beyond the free end of the panel mounting flange of the vehicle body panel such the extension part is configured to be attached to the at least one additional vehicle panel by the fastening structure.

2. The vehicle body structure according to claim 1, wherein
   the mounting bracket includes a body panel supporting portion with a support surface that contacts the main panel portion to support the main panel portion.

3. The vehicle body structure according to claim 2, wherein
   the main panel portion has a contoured interior surface, and the body panel supporting portion includes a contoured mating surface corresponding to the contoured interior surface of the main panel portion and contacting the contoured interior surface along a majority of one edge of the main panel portion that has the mounting bracket fixedly attached thereto.

4. The vehicle body structure according to claim 2, wherein
   the panel mounting flange of the vehicle body panel and the overlapping part of the bracket attachment portion of the mounting bracket are fixedly attached together with a plurality of rivets.

5. A vehicle body structure comprising:
   a vehicle body panel including a main panel portion defining an exterior fascia surface of a vehicle and a panel mounting flange extending from the main panel portion; and
   a mounting bracket fixedly attached to the vehicle body panel, the mounting bracket including a bracket attachment portion arranged to overlie the panel mounting flange and to extend beyond a free end of the panel mounting flange such that a fastening structure of the bracket attachment portion is located beyond the free end of the panel mounting flange of the vehicle body panel, the mounting bracket includes a body panel supporting portion with a support surface that contacts the main panel portion to support the main panel portion, the vehicle body panel and the mounting bracket being fixedly attached together with a plurality of rivets, and the panel mourning flange and the bracket attachment portion being fixedly attached with at least one of the rivets, and the main panel portion and the body panel supporting portion being fixedly attached with at least one of the rivets.

6. A vehicle body structure comprising:

a vehicle body panel including a main panel portion defining an exterior fascia surface of a vehicle and a panel mounting flange extending from the main panel portion; and a mounting bracket fixedly attached to the vehicle body panel, the mounting bracket including a bracket attachment portion arranged to overlie the panel mounting flange and to extend beyond a free end of the panel mounting flange such that a fastening structure of the bracket attachment portion is located beyond the free end of the panel mounting flange of the vehicle body panel;

the mounting bracket including a body panel supporting portion with a support surface that contacts the main panel portion to support the main panel portion, the panel mounting flange and the bracket attachment portion being fixed together at two spaced apart locations, and the main panel portion and the body panel supporting portion being fixed together at an additional location.

7. A vehicle body structure comprising:

a vehicle body panel including a main panel portion defining an exterior fascia surface of a vehicle and a panel mounting flange extending from the main panel portion; and a mounting bracket fixedly attached to the vehicle body panel, the mounting bracket including a bracket attachment portion arranged to overlie the panel mounting flange and to extend beyond a free end of the panel mounting flange such that a fastening structure of the bracket attachment portion is located beyond the free end of the panel mounting flange of the vehicle body panel, the mounting bracket including at least one locating pin, and the vehicle body panel including at least one locating opening with the at least one locating pin disposed therein to locate the mounting bracket relative to the vehicle body panel.

8. The vehicle body structure according to claim 7, wherein the mounting bracket includes a plurality of locating pins, and the vehicle body panel includes a corresponding plurality of locating openings with the locating pins at least partially disposed therein to locate the mounting bracket relative to the vehicle body panel.

9. The vehicle body structure according to claim 7, wherein the at least one locating opening is a through opening with the at least one locating pin extending therethrough beyond the panel mounting flange by a distance at least equal to a thickness of the panel mounting flange.

10. The vehicle body structure according to claim 1, wherein the fastening structure of the bracket attachment portion includes a J-nut attached thereto that is configured to receive an attachment bolt in order to couple the at least one additional vehicle panel thereto.

11. The vehicle body structure according to claim 1, wherein the vehicle body panel is a bumper fascia panel with a bent end portion configured to wrap around an end of a vehicle bumper, the bent end portion having the mounting bracket fixedly coupled thereto.

12. The vehicle body structure according to claim 11, further comprising the additional vehicle panel is fixedly attached to the bumper fascia panel via the mounting bracket.

13. The vehicle body structure according to claim 12, wherein the additional vehicle panel is a fender body panel having a curved shape configured to extend about a wheel well.

14. The vehicle body structure according to claim 13, further comprising a wheel housing liner panel fixedly attached to the bumper fascia panel via the mounting bracket.

15. The vehicle body structure according to claim 14, wherein the fastening structure of the bracket attachment portion includes a J-nut attached thereto and an attachment bolt attaching the fender body panel and the wheel housing liner panel thereto.

16. The vehicle body structure according to claim 15, wherein the bracket attachment portion includes a fender attachment section and a wheel housing liner attachment section that is angled relative to the fender attachment section, and the fender attachment section is coupled to the fender body panel with at least one of the J-nuts and at least one of the attachment bolts, and the wheel housing liner attachment section is coupled to the wheel housing liner panel with at least one of the J-nuts and at least one of the attachment bolts.

17. The vehicle body structure according to claim 12, wherein the additional vehicle panel is a wheel housing liner panel having an arcuate shape configured to form an interior surface of a wheel well.

18. The vehicle body structure according to claim 12, wherein the bent end portion of the bumper fascia panel has the exterior fascia surface and meets an additional exterior fascia surface of the additional vehicle panel to form a substantially contiguous flush overall outer body surface therebetween when the additional vehicle panel is fixedly attached to the bumper fascia panel via the mounting bracket.

19. The vehicle body structure according to claim 1, wherein the vehicle body panel is an elongated bumper fascia panel with a pair of opposite bent end portions configured to wrap around ends of a vehicle bumper, one of the bent end portions having the mounting bracket fixedly coupled thereto as a first mounting bracket and the other of the bent end portions having an additional panel mounting flange with an additional mounting bracket fixedly attached thereto tat is substantially a mirror image of the first mounting bracket.

20. The vehicle body structure according to claim 1, further comprising
a pair of additional vehicle panels with one of the additional vehicle panels being fixedly attached to the bumper fascia panel at each end portion via one of the mounting brackets.

21. The vehicle body structure according to claim 20, wherein
the additional vehicle panels are fender body panels with each having a curved shape configured to extend about a wheel well.

22. The vehicle body structure according to claim 21, further comprising
a pair of wheel housing liner panels with one of the wheel housing liner panels being fixedly attached to the bumper fascia panel at each end portion via one of the mounting brackets.

23. A vehicle body structure comprising:
a first vehicle panel including a main panel portion defining an exterior fascia surface of a vehicle and a panel mounting flange extending from the main panel portion at an angle to form a first exterior edge between the exterior fascia surface of the first vehicle panel and a mounting surface of the panel mounting flange;

a second vehicle panel including a main part defining contoured exterior surface and an attachment part extending from the main part at an angle to form an exterior edge between the contoured exterior surface of the second vehicle panel and a mounting surface of the attachment part; and a mounting bracket coupling the first and second vehicle panels together such that the mounting surface of the panel mounting flange mates with the mounting surface of the attachment part and the first and second exterior edges meet together, the mounting bracket including a bracket attachment portion having an overlapping part overlying the panel mounting flange on a side of the panel mounting flange that faces in an opposite direction to the mounting surface of the panel mounting flange, and an extension part extending parallel to the panel mounting flange and beyond a free end of the panel mounting flange, the extension part of the bracket attachment portion including a fastening structure coupling the attachment part to the extension part.

* * * * *